United States Patent [19]

Hales, II et al.

[11] Patent Number: 5,925,105

[45] Date of Patent: Jul. 20, 1999

[54] PREVENTING PROCESSOR DOMINATION DURING BACKGROUND DATA TRANSFER IN MULTIPOINT CONFERENCING

[75] Inventors: Loyde W. Hales, II; Tyler R. Thessin, both of Hillsboro, Oreg.

[73] Assignee: Intel Corporation, Santa Clara, Calif.

[21] Appl. No.: 08/921,689

[22] Filed: Sep. 2, 1997

Related U.S. Application Data

[63] Continuation of application No. 08/583,133, Dec. 28, 1995, abandoned.

[51] Int. Cl.$^6$ .................................................... G06F 11/22
[52] U.S. Cl. ............................................ 709/235; 709/224
[58] Field of Search ........................ 395/200.53, 200.54, 395/200.61, 200.64, 200.65

[56] References Cited

U.S. PATENT DOCUMENTS

| | | | |
|---|---|---|---|
| 5,220,653 | 6/1993 | Miro | 395/275 |
| 5,247,671 | 9/1993 | Adkins et al. | 395/650 |
| 5,257,386 | 10/1993 | Saito | 395/775 |
| 5,303,243 | 4/1994 | Anezaki | 371/9.1 |
| 5,325,522 | 6/1994 | Vaughn | 395/600 |
| 5,367,635 | 11/1994 | Bauer et al. | 395/200 |
| 5,446,894 | 8/1995 | De Mar et al. | 395/650 |
| 5,452,299 | 9/1995 | Thessin et al. | |
| 5,623,603 | 4/1997 | Jiang et al. | 395/200.04 |

*Primary Examiner*—Thomas R. Peeso
*Attorney, Agent, or Firm*—Charles K. Young

[57] ABSTRACT

Preventing processor domination of a CPU by background transfers of teleconference object data during an electronic conference is accomplished by monitoring an external time spent by a CPU executing outside a background transfer manager. Transfers of data packets of teleconference object data are performed if the external time is larger than a minimum threshold and smaller than a maximum threshold.

25 Claims, 12 Drawing Sheets

PREVENTING PROCESSOR DOMINATION DURING BACKGROUND DATA TRANSFER IN MULTIPOINT CONFERENCING

This is a continuation of application Ser. No. 08/583,133, filed Dec. 28, 1995, now abandoned.

FIELD OF THE INVENTION

The present invention is related to teleconferencing systems. More specifically, the present invention is related to mechanisms for communicating data among a plurality of participants in a multipoint electronic conferencing system.

BACKGROUND OF THE INVENTION

One of the more developing areas of computer networking is the field of electronic conferencing. Conferencing provides the ability to have an electronic on-line "meeting" between a plurality of users on computer systems in a variety of locations. Users at a variety of sites may communicate with one another as if they were in the same room. Using such application programs, modem communication systems have enabled the ability to have a meeting wherein all users participate in the meeting through their individual computer systems and share data, graphics, text and other types of information. Users may communicate with one another sharing data in the form of graphical images, text or other annotations and other information represented on the computer system display. This is analogous to a meeting where participants in a face-to-face meeting may display information to one another on a whiteboard or blackboard and other participants may add annotations, delete or otherwise modify the board. It is also anticipated that as bandwidth of communication media improves and compression standards for graphical data also become more robust that recorded (or stored) video data may also be shared among a plurality of connected users during such teleconferences.

One of the requisites of an electronic conferencing system is the need to replicate the same data on all of the users' displays participating in the conference. Such systems typically implement this capability in a variety of ways. The most common is the client/server model wherein a single connected node acts as a "server" of other nodes in the system and the remaining nodes connected in the conference act as slaves or clients to the server process. Thus, each of the clients merely receive data from the central machine to update their displays. Such systems, however, are entirely dependent upon the service being provided by the server and the throughput of the communication medium. Obviously, systems wherein the clients merely act as displays and inputs for user requests suffer from severe performance problems due to resulting updates of data from the server, which is typically handled serially by the server.

Another prior art solution for maintaining all of a participant's display in a conferencing system synchronous rely on a distributed client/server system. In a distributed client/server approach a shared object structure is kept on the server and clients are made aware of changes of that distributed information through alerts or demons. The disadvantage of this approach, similar to the centralized client/server approach is the reliance on the architecture itself. This includes a data conferencing application which must be able to connect several users over a phone line from point to point without requiring access to a centralized common server.

In the client/server approach, moreover, performance suffers greatly because requests to add or delete objects such as annotations, graphical images or other information on a participant's display is entirely dependent upon communication from the server. Thus, real-time performance severely suffers in prior art client/server models since approval to act and manipulate upon objects on a participant's display is entirely dependent upon a whole set of dependent variables such as the number of requests to the server pending, the throughput of the communication medium, the number of participants connected, etc.

Yet another prior art approach for maintaining synchronicity of a plurality of participants in a conferencing system is the use of a distributed object-oriented system.

This is a generalized approach which relies upon extensions, in one prior art solution, of the SmallTalk language itself. In this prior art system, "local" objects send messages to "proxy" objects which are local representatives for objects in the "shared" object space. The proxy objects communicate with the real objects through an RPC (Remote Procedure Call) mechanism. RPC is a protocol governing the method with which an application activates processes on other nodes and retrieves the results. Such a conventional mechanism is defined by Sun Microsystems, Inc. and described in RFC-1057 that provides a standard for initiating and controlling processes on remote or distributed computer systems.

The problem with this approach is in its generality which requires extensive support for sharing any object while making no assumptions about the behavior of objects. This has two disadvantages. First, a complex "SmallTalk system" is needed to support the distribution of objects in general. Second, the concurrency problem for any object is difficult because multiple participants may have different objects in their systems and such different objects may not be able to be communicated to the remaining users.

Certain issues arise when large amounts of data, such as Binary Large OBject (BLOB) data, are transferred during an electronic conference. For example, a user's system may experience a delay in the refresh of the screen if the CPU of that system is busy transferring the BLOB. Additionally, the transfer of a BLOB may need to be reprioritized if a request for a different BLOB is received. For more information about the transfer of large object data in an electronic conferencing system, please see U.S. Pat. No. 5,452,299, entitled "Optimized Transfer of Large Object Data Blocks in a Teleconferencing System," which is incorporated herein by reference.

The issues associated with the transfer of BLOBs are multiplied in a multipoint conference compared to a point-to-point conference. A multipoint conference is a conference in which there are three or more participants. In a point-to-point conference, only two participants are conferenced together. In a multipoint conference, for example, extra bookkeeping is required to keep track of which data has been provided to which participants. While the present invention is particularly useful in a multipoint conference, the present invention is also applicable to a point-to-point conference.

SUMMARY OF THE INVENTION

A method and apparatus for preventing processor domination of a CPU by background transfers of teleconference object data during an electronic conference is disclosed. The external time spent by the CPU executing outside a background transfer manager is monitored. Transfers of data packets of teleconference object data are performed if the external time is larger than a minimum threshold and smaller than a maximum threshold.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

DETAILED DESCRIPTION OF THE PRESENT INVENTION

The present invention relates to methods and apparatus for communication between agents in an electronic conferencing system. Although present invention will be described with reference to specific signal names, formats, time intervals and other specific information, these are to be viewed to be used for illustration purposes only and not to be construed as limiting the present invention. It can be appreciated by one skilled in the art that many departures and modifications may be made without departing from the overall spirit and scope of the present invention.

Figure 1A:
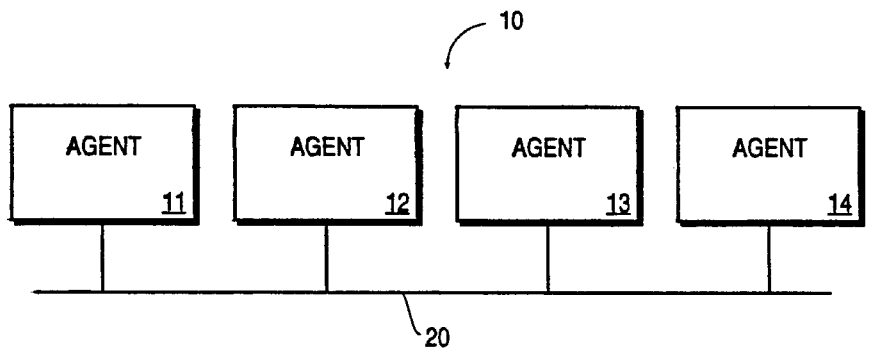
FIG. 1a illustrates a topology of a system in which various agents may be connected in a conferencing system.

As illustrated in FIG. 1a, a communication system may comprise a plurality of agents such as 11–14 which are all coupled to a communication medium, e.g., 20 illustrated in FIG. 1a. In certain embodiments of the present invention, each individual agent coupled to the medium 20 has equivalent capabilities to provide communication between the agents. The implemented conferencing system uses a distributed approach wherein each of the agents 11–14 maintains local copies of the conferencing structure (called a "meeting") which shall be consistent with one another. In addition, one of the agents 13, in one embodiment of the present invention, acts as an arbitrator to grant requests to add objects to various structures within each agent to maintain consistency among the displayed objects on each of the agents' systems. The system used in various embodiments of the present invention uses a distributed architecture, wherein each agent 11–14 maintains local copies of all the objects being used in the electronic conference. Thus, displays, text, graphics and other information displayed on the agents' computer system displays are represented in data structure maintained in each of the systems' local memory and/or media devices coupled to those systems. Thus, the present system comprises a hybrid of the client/server architecture wherein, instead of maintaining centralized copies of all the objects in the electronic conferencing system, each agent maintains a local copy of the data so that changes to the data may be more or less immediate. The structure of one agent, which may be coupled to the communication medium such as 20 illustrated in FIG. 1a, is illustrated with reference to FIG. 1b.

Figure 1B:
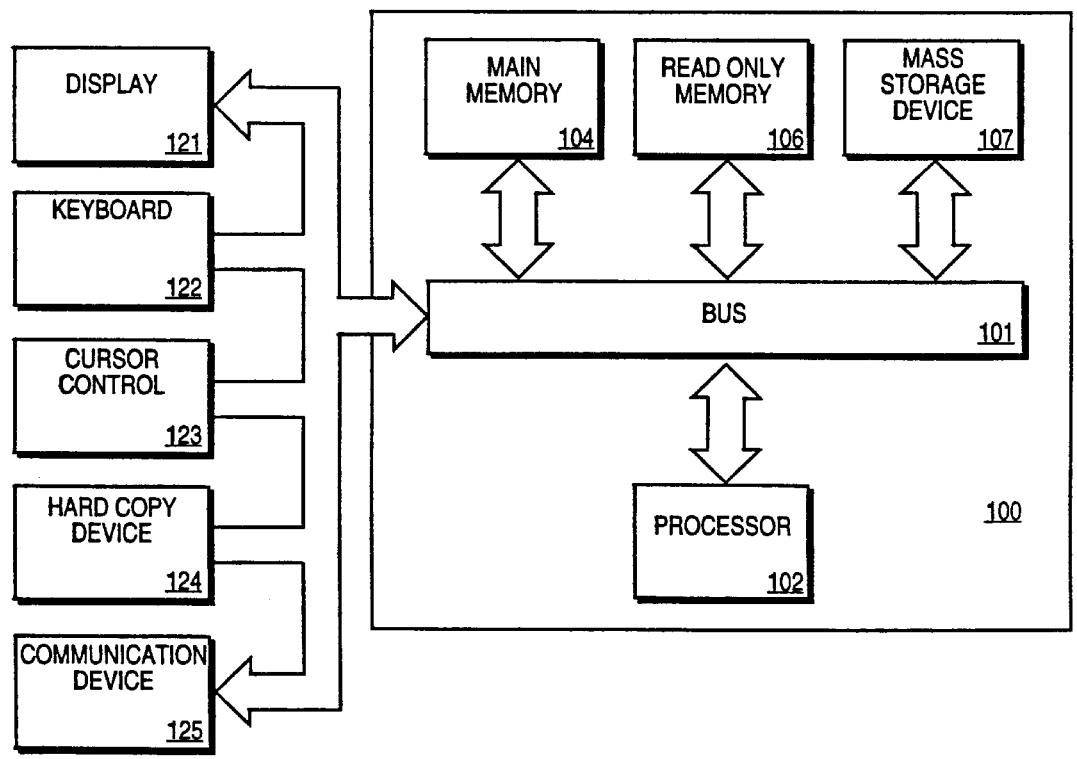
FIG. 1b illustrates a block diagram of circuitry contained in one agent participating in a conferencing system.

Referring to FIG. 1b, a system upon which one embodiment of an agent (e.g., 11 of FIG. 1a) of the present invention is implemented is shown as 100. 100 comprises a bus or other communication means 101 for communicating information, and a processing means 102 coupled with bus 101 for processing information. System 100 further comprises a random access memory (RAM) or other volatile storage device 104 (referred to as main memory), coupled to bus 101 for storing information and instructions to be executed by processor 102. Main memory 104 also may be used for storing temporary variables or other intermediate information during execution of instructions by processor 102. System 100 also comprises a read only memory (ROM) and/or other static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions. System 100 may further be coupled to a display device 121, such as a cathode ray tube (CRT) or liquid crystal display (LCD) coupled to bus 101 for displaying information to a computer user. An alphanumeric input device 122, including alphanumeric and other keys, may also be coupled to bus 101 for communicating information and command selections to processor 102. An additional user input device is cursor control 123, such as a mouse, a trackball, stylus, or cursor direction keys, coupled to bus 101 for communicating direction information and command selections to processor 102, and for controlling cursor movement on display 121. Another device which may be coupled to bus 101 is hard copy device 124 which may be used for printing instructions, data, or other information on a medium such as paper, film, or similar types of media. In the described embodiments, another device which is coupled to bus 101 is a communication device 125 which is used for communicating with other agents. This communication device may include any of a number of commercially available networking peripheral devices such as those used for coupling to an Ethernet or Token-Ring communication medium. Note, also, that any or all of the components of system 100 and associated hardware may be used in various embodiments, however, it can be appreciated that any configuration of the system may be used for various purposes according to the particular implementation.

In one embodiment, system 100 is an IBM compatible type personal computer. Processor 102 may be one of the Intel-Architecture microprocessors, such as the 80386, 80486 or Pentium® brand microprocessor manufactured by Intel Corporation of Santa Clara, Calif.

Note that the following discussion of various embodiments discussed herein will refer specifically to a series of routines which are generated in a high-level object-oriented programming language (e.g., the Microsoft C/C++) available from Microsoft, Inc. Redmond, Wash. This series of routines is compiled, linked, and then run as object code in system 100 during run-time. It can be appreciated by one skilled in the art, however, that the following methods and apparatus may be implemented in special purpose hardware devices, such as discrete logic devices, large scale integrated circuits (LSI's), application-specific integrated circuits (ASIC's), or other specialized hardware. The description here has equal application to an apparatus having similar function.

Software Organization of an Agent

Figure 2:
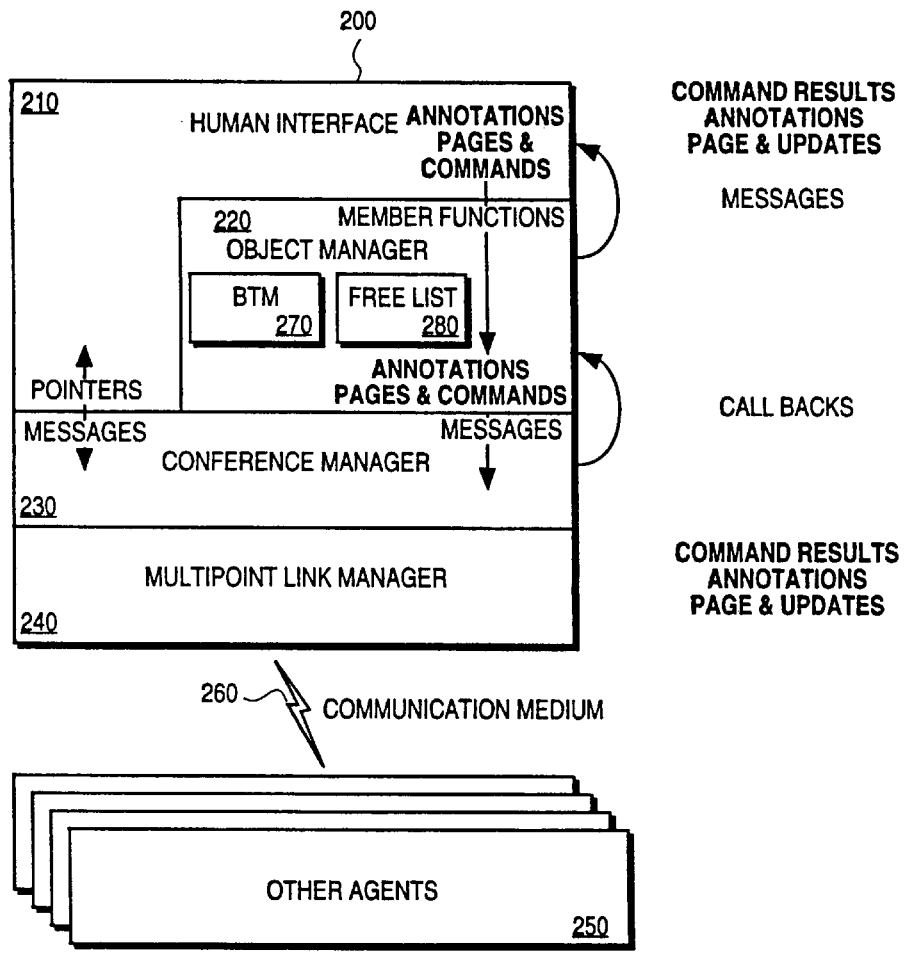
FIG. 2 illustrates a block diagram of the various control processes which are present in an agent participating in a conference.

Operative within each agent during conference run time is a series of software procedures which are organized in the manner illustrated with reference to FIG. 2. FIG. 2 illustrates 200 which is a general block diagram of the organization of the processes within a single agent in one embodiment of the present invention. The software organization 200 within a single agent comprises a multi-point process 240 which is responsible for direct communication onto the communication medium 260 so that other agents 250 may be communicated with. This provides all the low-level communication functions which allow direct accessing communication medium 260. In different embodiments of the present invention, communication medium 260 may be any one of the various networking standards used including local area networks such as Ethernet, Token-Ring or other types of networking standards. Communication medium 260 may also be a telephone network and modem connection or other data communications medium. Multipoint function 240 thus provides all the necessary packetization and responses to communication received over communication medium 260.

The next higher level in the software organization 200 of a single agent is the conference manager 230 which provides all the necessary executive functionality for communication with the low level communication functions 240 and the higher level functions provided by the human interface process 210 and the object manager 220. The conference manager 230 controls the object manager 220 through a series of callbacks to commands in the conferencing system which are desired to be executed. Conference manager 230 also executes the callbacks in object manager 220 according to messages which are received from the communication process 240 and directs the creation, deletion or other action upon objects in the system. Objects within the system such as annotations, pages, commands and other objects used within the system are treated using an object-oriented system wherein hierarchies of objects are defined.

Communication from object manager 220 to conference manager 230 is provided via messages which are passed to the multi-point link manager 240 for the creation of objects, arbitration between the arbitrator and the agent and communication with other agents in the conference. Moreover, conference manager 230 directs human interface process 210 via pointers to display various things on the display. Results from the display of human interface functions are passed back to the conference manager 230 via messaging.

Object manager 220 is a process which is operative during run time to keep track of the various objects used during a conference between the agent and other agents in the system. The object manager coordinates the meeting between the agents. The object manager keeps track of all objects created during the meeting, including, other agents, the various things displayed during the conference and other objects. In addition, the object manager is used for maintaining the status of the meeting and keeping all the other agents synchronized with the current agent. Contents of a meeting may be saved and retrieved from mass storage (e.g., 107 of FIG. 1b) when exiting or entering a conference (or during the conference). The object manager also exchanges meeting contents with other object managers in other agents to keep copies of the meeting synchronized.

A Background Transfer Manager (BTM) 270 resides within the object manager 220. The BTM is responsible for sending and receiving messages associated with the transfer of background data among the various agents which are conferenced together. The BTM handles background recovery of lost data, preventing processor domination by background activity, and prioritizing background data requests, as will be described.

A free list 280 also resides within the object manager 220. The free list is used to store data temporarily, as will be described later with reference to FIG. 7.

Each object manager 220 maintains its own local copy of the meeting which is provided to human interface 210 as required. Object manager 220 informs human interface 210 about changes from other agents participating in the meeting. Human interface layer 210 then adjusts the display as directed. Human interface 210 also informs the object manager about changes that the user wishes to make to the current meeting. Object manager 220 then synchronizes the changes with all other object managers participating in the meeting. The object manager controls the human interface through messaging, as does the human interface direct the object manager to perform certain actions upon objects, according to the adjustment of the display under control of human interface 210. A brief overview of the structure of objects in one embodiment of present invention is illustrated with reference to FIG. 3.

Object Classification Structure

Figure 3:
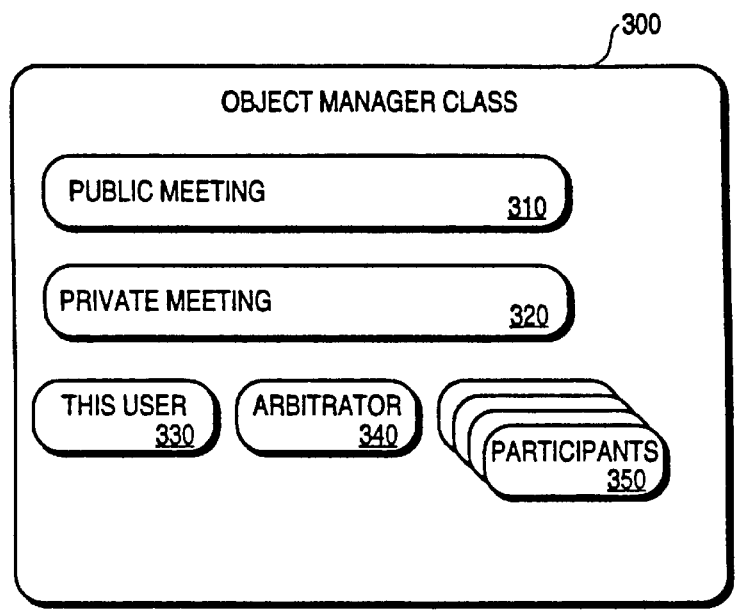
FIG. 3 illustrates a block diagram of classes used in one implemented embodiment of the present invention.

FIG. 3 illustrates a general classification of the high level objects which are used in one embodiment of the present invention. In this embodiment, the object manager class 300 comprises the broadest classification of objects within the system. Generally, within the object manager class, are two general areas, public meetings 310 and private meetings 320. The object manager maintains information that the user has entered into his private space in the private meeting object class 320 which is distinct from the public meeting object class 310. Each is maintained as a separate structure of objects within the meeting class. Therefore, during a public meeting stored in public meeting class 310, a user may similarly store private information 320 also to be associated with that same meeting.

In addition, object manager 220 maintains information about the user in classification 330 and arbitrator 340, of which there is only one during any one electronic conference and the other participants in the meeting in a participants classification 350. These are all also members of the object manager class. Object manager 300 keeps track of the participants in the meeting. For example, when new participants join the meeting, the new participants' copies of the meeting are brought into synchronization with all of the other participants'. As participants leave the meeting, all of each user's contributions are ensured to be shared before the participant leaves the meeting.

One of the agents or participants in the meeting is known as the arbitrator. This is represented in the arbitrator class 340. The arbitrator resolves conflicts between users when question of control of meeting properties arise. The arbitrator determines which participant controls an annotation, how many pages exist in the present meeting, etc. It also keeps a master copy of the meeting that all other participants synchronize to. Object managers within each agent or participant coordinate who the arbitrator is and assign a new arbitrator when the assigned arbitrator leaves the meeting or as dictated by other conference events—such as opening/merging a meeting file in which the participant opening/merging the meeting file becomes the arbitrator prior to opening/merging the file. In one implementation of the present invention, the first user to start a meeting is assigned the arbitrator.

Figure 4:
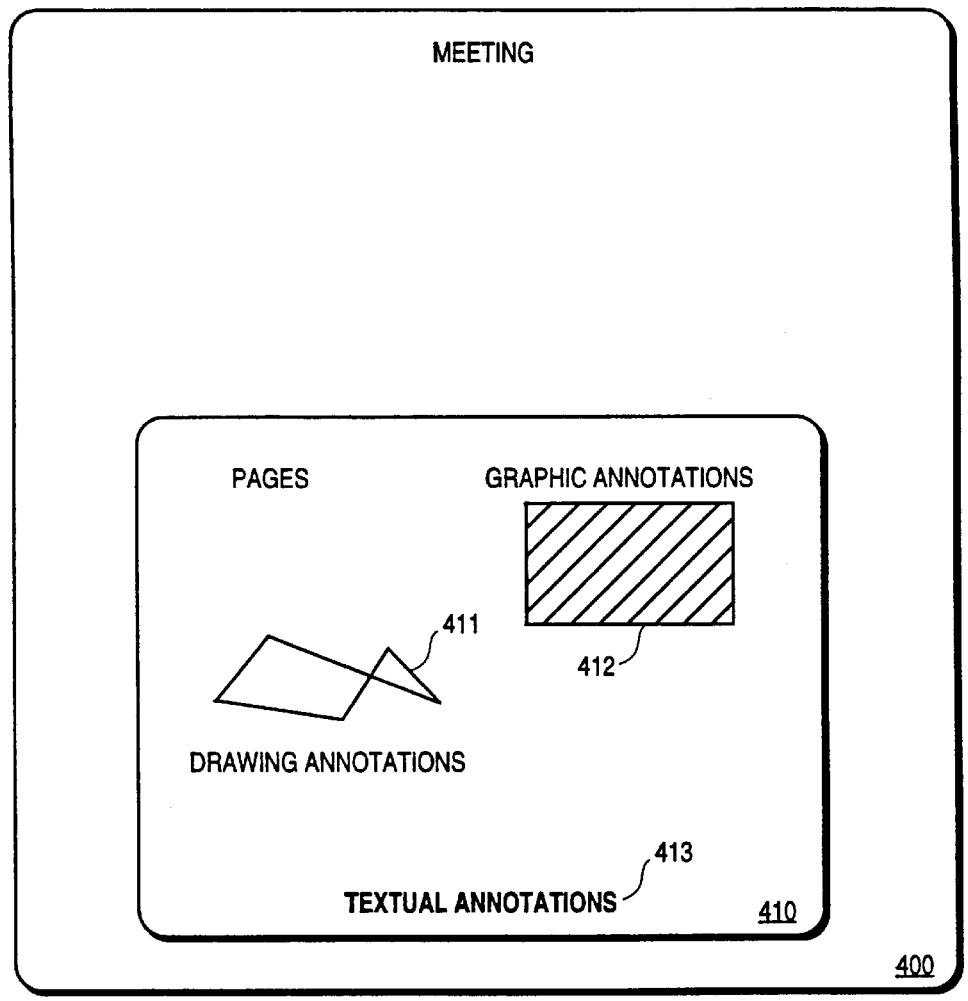
FIG. 4 illustrates the types of annotations which may be performed upon a user interface display of a single agent within various implementations of the preferred embodiment.

A very rough approximation of the types of objects which may be present upon a participant's display is illustrated with reference to FIG. 4. Generally, a user will have a meeting area 400 on his display in which various information may be entered. Typically, each meeting comprises a series of pages which is analogous to a single white board or shared display space which users in a room could access. Analogously, one embodiment of the present invention uses the notebook metaphor which is, in fact, a shared "notebook" among a plurality of participants in the meeting into which every participant may enter information. The shared area or notebook comprises a plurality of pages 410 onto which annotations may be made. Users may create or delete pages at will, subject to certain conditions. Annotations on the pages may comprise one of at least four types, in one embodiment of the present invention. The first three of these types are illustrated in FIG. 4. For instance, a page 410 may comprise a drawing annotation 411 which is typically an object-oriented drawing created by a single user. Such object-oriented drawing illustrations as 411 comprise a description of point positions and segments between them and are well-known to those in the prior art. Annotations may also comprise graphic annotations 412 which are generally bitmap representations of graphic image data. Textual annotations 413 may be placed upon a page. Textual annotations can be any of the user's choosing and, including in certain prior art implementations, allowing users to choose style, point size, font and other formatting information as is typical in the prior art. One other annotation which may be used in one embodiment of the present invention is the OLE annotation using the Object Linking and Embedding (OLE) protocol available from Microsoft Corporation of Redmond, Wash. OLE annotations may reference other "objects" created and/or maintained by other application programs and which may be either linked or embedded using OLE. Each of these annotations is stored as an object under an "annotation" classification which is associated with objects in the page classification.

Recovery of Lost Data

One of the types of object data which may be transferred between participants in an electronic conference is known as a very Binary Large OBject or "BLOB." Because of their size, BLOBs are usually broken into smaller portions, or packets and transmitted over several cycles as a background task. BLOBs typically comprise items such as very large graphic data, OLE annotations or files to be transferred. In other embodiments of the present invention, such BLOBs may include full-motion video objects such as MPEG or JPEG files and/or audio data. Using the methods and apparatus described, the BLOB data is transmitted in packets. In one embodiment, the size of each of the packets is dynamically based upon the capabilities of the transport medium, which may dynamically change as the connection between participants change. Therefore, if the speed of the connection between two participants' transport medium changes, the size of packets transmitted by the transmitter is changed. This is done dynamically during transmission time, in order to allow the most efficient use of the transport medium during the transmission of BLOBs. In addition, BLOB transmit requests are queued so that higher-priority BLOBs may be transmitted before lower-priority BLOBs. In this way, when a participant who is viewing a first page containing BLOB data switches pages to a second page also containing BLOB data, the BLOB data for the second page becomes reprioritized within the transmitter to be transmitted ahead of the BLOB for the first page.

During a typical electronic conference, BLOB data may not necessarily be transmitted to other participants upon creation of a BLOB within a local participant. In other words, transmission of the data for a BLOB may be deferred until a later time at which the transport medium may be idle, or the local participant has some idle processing time. Therefore, during creation of a BLOB, remote participants may be notified that the BLOB data is not contained within the BLOB to be created, and the remote participant(s) only create the object in their local meeting structures for the BLOB absent any data. BLOB data is transferred later via the BTM 270. A typical chronology of actions which may be performed during a BLOB creation and transmission is illustrated with reference to FIG. 5.

Figure 5:
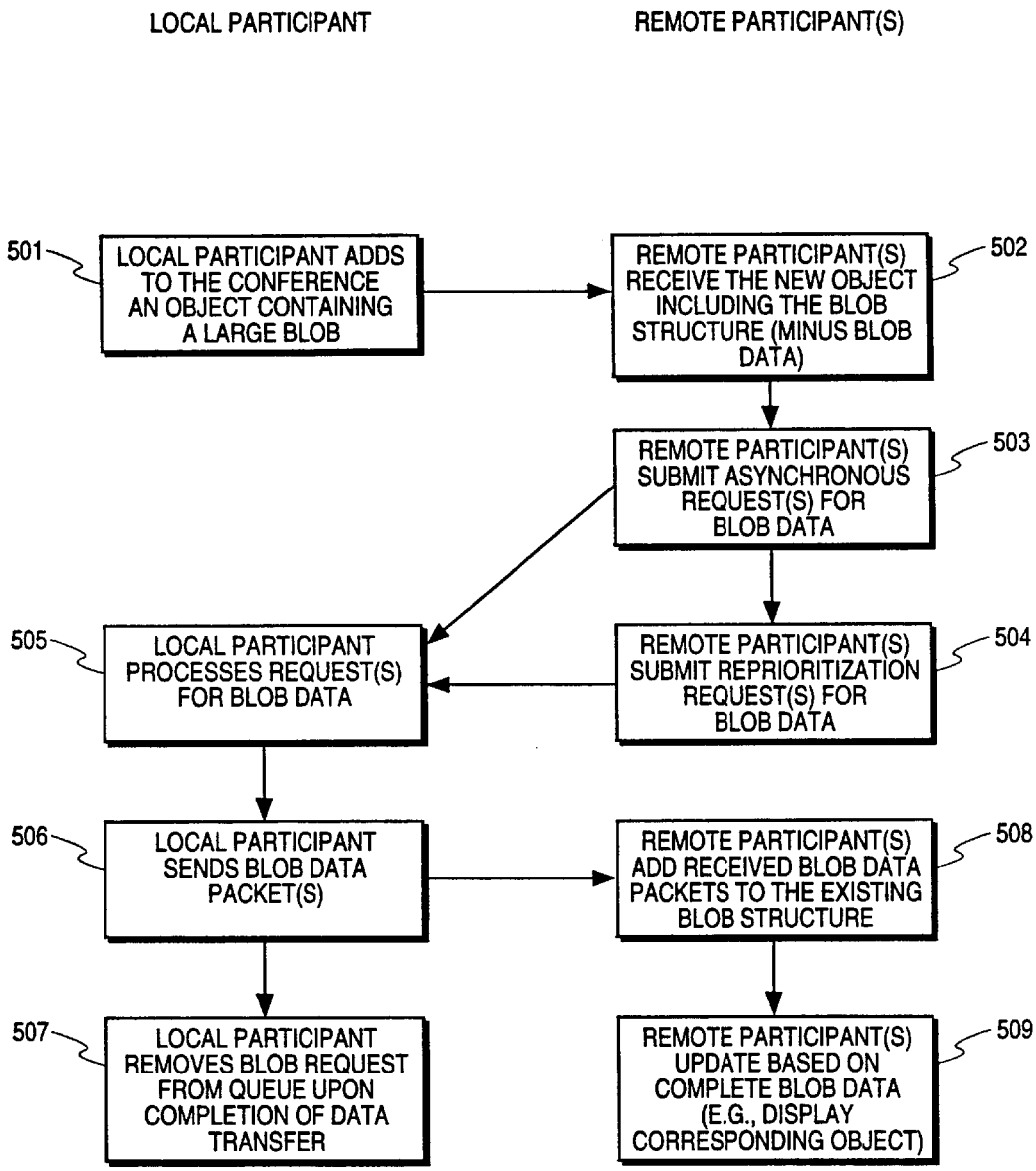
FIG. 5 illustrates a method used for the deferred transfer of very large binary object (BLOB) data within certain embodiments of the present invention.

The steps illustrated with reference to FIG. 5 illustrate the sequence of steps taken by local and a remote participant(s) engaged in a conference. For example, at a first step such as 501 in FIG. 5, a local participant may add to its local meeting structure an object containing a BLOB. The object manager 230 contained within the local participant will then notify all the remote participants that they should also create within their local meeting structures an object for a BLOB, at step 502. This step may be performed using a deferred synchronization process as described in U.S. Pat. No. 5,452,299, entitled "Optimized Transfer of Large Object Data Blocks in a Teleconferencing System." Then, each of the remote participants individually submits asynchronous requests at step 503 to the local participant for the BLOB data. The local participant then, at step 505, processes the request for BLOB data such as placing the request in a BLOB request queue and later providing the data via the BTM. Also, subsequent to the asynchronous requests by various participants for the BLOB data at step 503, the remote participants may further submit reprioritizations of prior requests for BLOB data at step 504. In other words, if a remote participant had first requested BLOB 1 and then later subsequently requested BLOB 2, the two requests may be reprioritized so that BLOB 2 may take priority over BLOB 1 for the remote participant. In this manner, if the remote participant switches from a first page containing BLOB 1 to a second page containing BLOB 2, the local participant will then re-order the BLOB requests for that particular participant.

As already discussed, the local participant processes requests for the BLOB data at step 505. The local participant then sends to each of the remote participants the requested BLOB data packets at step 506. BLOB data packets are sent according to the transport medium between the participants. Therefore, if the remote participant is connected to a high-capacity, high-speed transport medium such as a Ethernet, then the size of the data packets will be substantially larger than if the participant were connected via modem over a telephone line. As the local participant sends the BLOB data packets at step 506, each of the remote participants receives the BLOB data and adds the BLOB data packets to the existing BLOB data structure at step 508. The local participant after completion of the transmission of all the BLOB data packets for the requested BLOB, removes the BLOB from the request queue at step 507. From block 508, the human interface process of the remote participant is notified to update the display of the previously incomplete BLOB-containing object at step 509.

A BLOB is considered missing when some or all of its data is not present in a participant's notebook, and no other participant has offered to provide the data yet. This can happen as a consequence of using any background transfer strategy. Usually, data are transferred as time permits and only when requested. Therefore, any given participant has a period of time in which he knows about an annotation comprised of a BLOB but has not yet received all the data via the Background Transfer Manager (BTM). For example, assume Participant A creates a BLOB and all of the other participants are told about the annotation. Subsequently, the other participants request the data from Participant A. If Participant A's computer providing the BLOB were to fail before transferring all the data, then the data would be missing relative to the other participants. In some cases, however, all of the data may have been transferred to another participant, such as Participant C, before Participant A's computer failed. In this case, the participants who still need the data can retrieve the data from Participant C. This may occur, for example, if Participant C requested the data earlier than the other participants, or Participant C had a faster transport medium allowing data transfer to have completed sooner.

Figure 6:
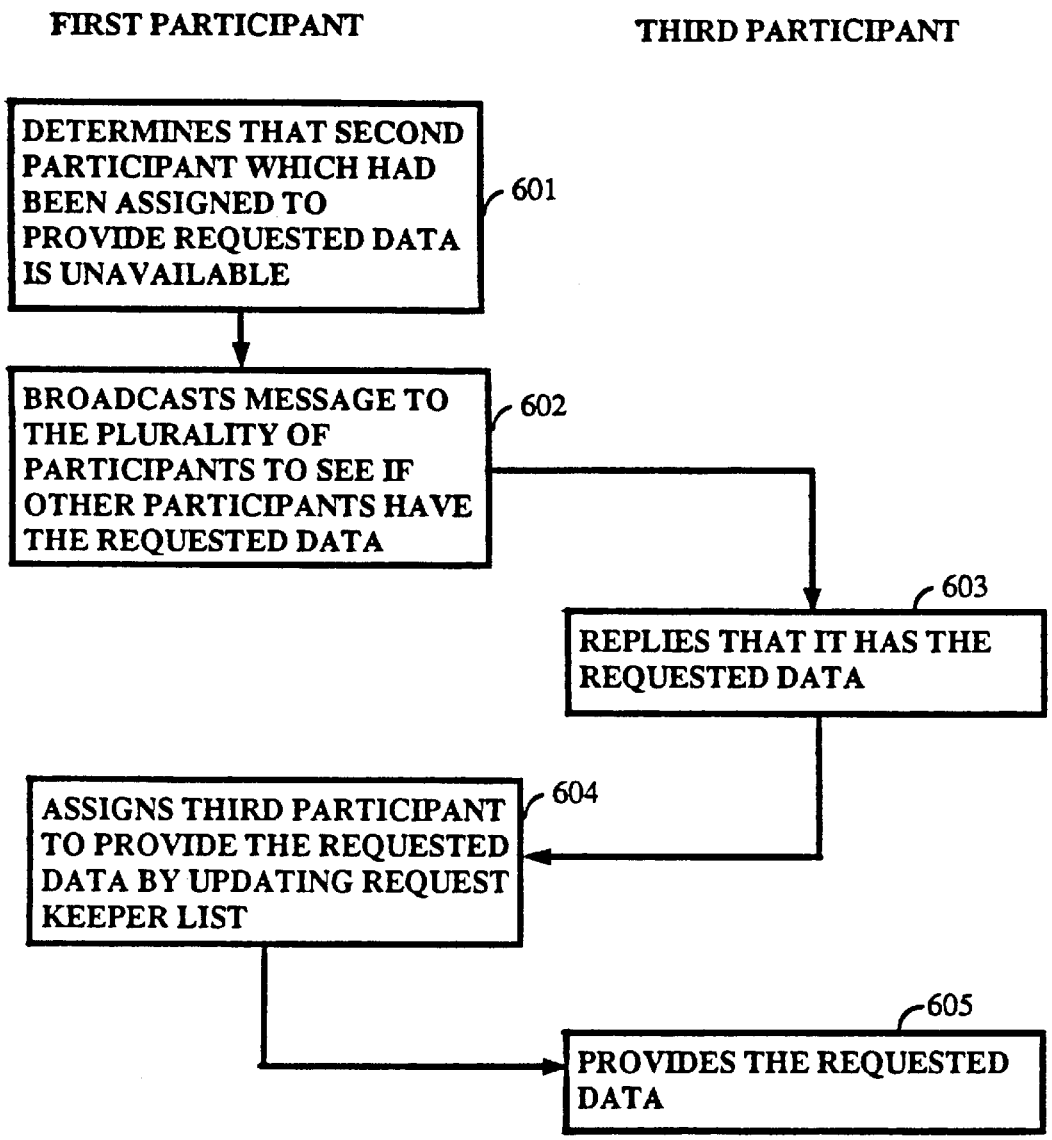
FIG. 6 shows a flow diagram showing the steps taken by a participant to recover missing data.

FIG. 6 shows a flow diagram showing the steps taken by a participant to recover missing data. At block 601, a first participant determines that a second participant, which had been assigned to provide requested data to the first participant, is now unavailable. At block 602, the first participant broadcasts a message to all of the other participants to see if the other participants have the requested data. In one embodiment, the broadcast message includes a query for all other missing data which the first participant seeks. This is bundled together in one message in order to save bus bandwidth.

The flow diagram continues at block 603, at which a third participant replies to the first participant that it has the requested data. In one embodiment, in order to save bus bandwidth, a participant will only reply to a broadcast message seeking requested data if that participant has the requested data; if the participant does not have the requested data, it will not respond.

At block 604, the first participant assigns the third participant as the provider for the requested data. In one embodiment, the first participant maintains a request keeper list which maintains a list of all missing data of that participant. When a provider for any of the missing data is found then the request keeper list is updated to indicate the participant which is to provide the missing data. From block 604, the flow diagram continues at block 605, at which the third participant provides the requested data to the first participant.

Figure 7:
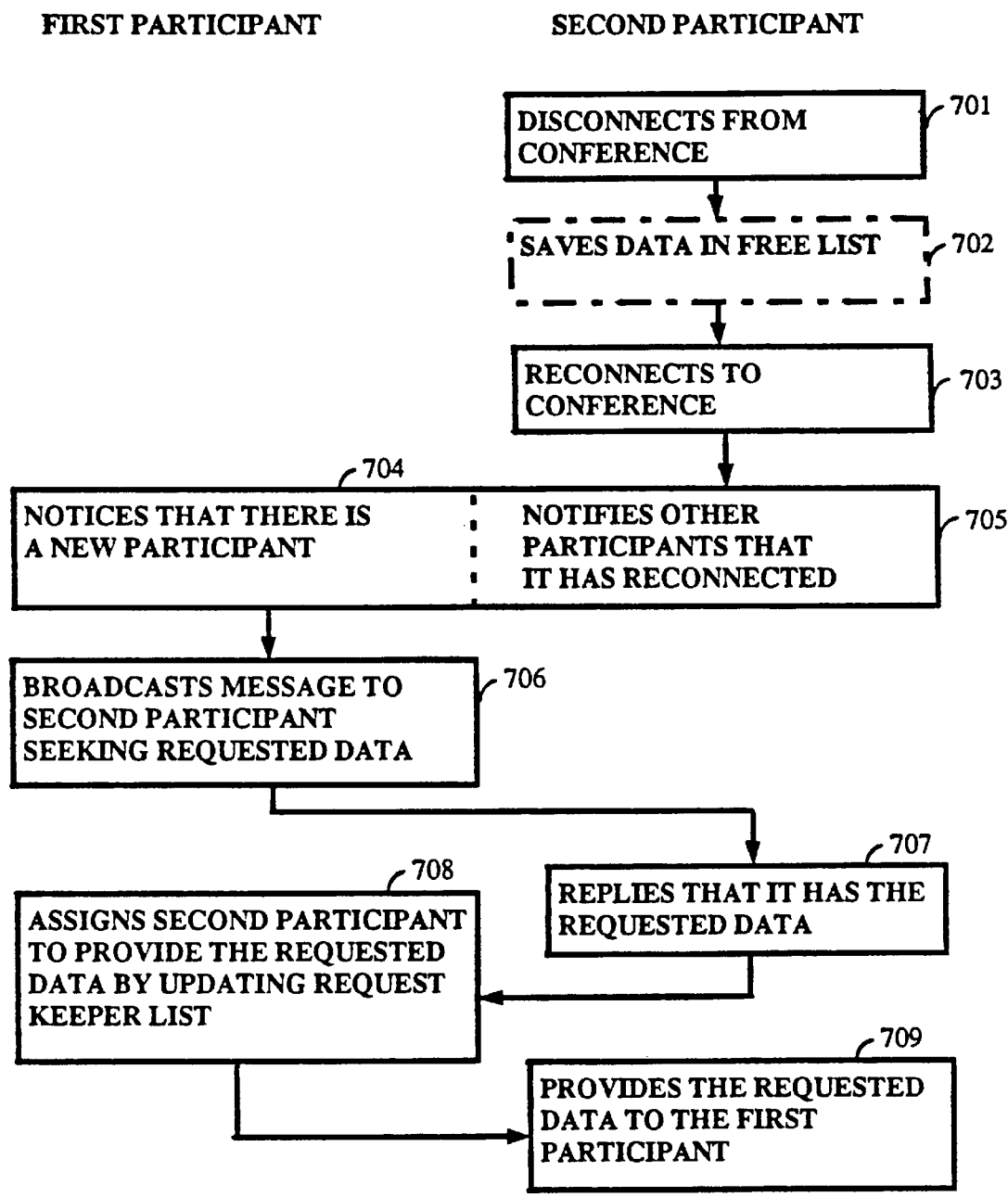
FIG. 7 illustrates the steps taken by a first participant and a second participant after the second participant has disconnected from the conference.

FIG. 7 illustrates the steps taken by a first participant and a second participant after the second participant has disconnected from the conference. At step 701, the second participant disconnects from the conference. There are many reasons why the second participant may have disconnected. It could have been intentional or accidental. The disconnect could have been due to a computer failure, or simply a network, or communication link failure. If the problem was due to a communication failure, then likely, the second participant still has all of its data. If the second participant had been scheduled to provide a BLOB to the first participant, then upon reconnecting to the conference, the second participant would be able to provide the data to the first participant.

However, if a user were to clear his notebook prior to reconnecting to the conference, either accidentally or unknowingly by a novice user, the data is saved to the free list 280, as shown by optional block 702, where it resides until it is later purged when the notebook requires more memory. In one embodiment, the free list resides within the object manager 220. Thus, the data remains available for requests by other participants. From optional block 702, the flow diagram proceeds at block 703.

At block 703, the second participant reconnects to the conference. In one embodiment, the second participant notifies the other participants that it has reconnected once it has taken care of some initial bookkeeping activities. However, one of the other participants, such as the first participant may notice that the second participant has returned before the second participant sends out its notice, as in step 704.

After steps 704 and 705, which are performed alternatively, so as to let the first participant know that a new participant has joined the conference, the first participant broadcasts a message to the second participant seeking any data still missing from the first participant at step 706.

At step 707, the second participant responds that it has the requested data, if in fact it still has the data. If, for example, the second participant's computer had failed and had to be rebooted, then the second participant may not have the data anymore.

At step 708, the first participant assigns the second participant as the keeper for its missing data which the second participant will provide, and at step 709, the second participant provides the requested data to the first participant.

In one embodiment, the entire flow diagrams of FIGS. 7 and 8 are performed as background tasks by the BTMs 270 of the respective participants. Thus, the missing data is found without the users' needing to know about the problem. Of course a similar method could be used, as a foreground task, but background transfer is especially suited for the transfer of BLOBs.

Additionally, in one embodiment, the first participant will take the participant which replies first to be its provider of the missing data. This turns out to be the participant with either the fastest system, the fastest transport medium, or the one with the most resources to spare. Note that the present invention is also applicable to a point-to-point conference involving just two participants, if, for example, one of the participants is dropped from the conference temporarily.

Thus, a method an apparatus for recovering missing data during an electronic conference is disclosed. In one embodiment, the requests for transfer of BLOBs is prioritized as will be disclosed with respect to FIG. 11. In another embodiment, this is also combined with the method and apparatus for preventing processor domination by background tasks, to be described next.

Preventing Processor Domination by Background Activity

Background transfers are handled by the Background Transfer Manager (BTM) 270. Background transfers ideally should have a minimal impact on foreground activity: users should perceive little degradation in performance while transferring data, even if they start additional applications.

Three main times in which the BTM 270 may need to alter its data transfer rate occur when:
1) the BTM spends too much time sending data and processing requests;
2) the foreground applications needs more time, due to additional processing requirements; and
3) remotely-initiated actions, such as receiving a datagram or request, flood the local BTM, abnormally increasing the time spent in BTM-related activities.

The BTM transfers data among the agents, or participants, in the conference by sending packets of data and routinely processing its lists. As the number of data requests increases (or on slower computers, e.g., an Intel486® vs. a Pentium® processor), the BTM may use more CPU cycles than is optimal, effectively stealing from foreground applications. Similarly, if the user requires more horsepower to handle additional load, the BTM must surrender its cycles to balance.

The common approach to resolving processor competition is performed by the operating system. The Microsoft Windows™ Operating System is described as "cooperative tasking." In short, this means that the operating system does not arbitrate resources among processes. When an application is given a chance to run, i.e., CPU-time, it may continue more-or-less until it surrenders its resources; all other applications must wait. This creates a worst-case resource problem for a truly background task: it will get the CPU as often as any other task, regardless of the foreground requirements.

Operating systems such as Windows NT provide priority scheduling, where each thread (or process) has a priority, and the operating system will tend to assign the CPU to higher-priority threads more than lower-priority threads. However, even within Windows NT's priority mechanism, a background task may interfere with the performance of other tasks. For example, the background task may dominate the CPU with respect to lower-priority tasks or secure a semaphore required by a foreground task.

To resolve this problem, the BTM must perform some form of throttling to reduce the amount of time consumed by background activities based on a dynamic measure of system performance. One solution is for the BTM to back-off when it detects high local activity. The BTM uses two "stopwatches" to monitor system performance. One records the CPU time the foreground tasks are using; the other records the CPU time the BTM is using. When the BTM time is high, it obviously indicates that the system is spending too much time processing BTM actions. The BTM would be backed-off.

Ironically, when the foreground time becomes very large, the BTM is also backed-off. The very large foreground time indicates that the foreground tasks are not yielding or a sufficient number are running as to give the impression that a task is not yielding. In our cooperative tasking system, a task does not yield when it is performing a CPU-intensive operation, such as adding a complex OLE object via drag-and-drop. Therefore, the foreground requires more of the CPU than usual. The BTM backs-off by increasing an offset to the amount of time that the foreground tasks must minimally take. By using the offset, the BTM can effectively delay its servicing of background tasks by ignoring one or more of its servicing windows provided by the operating system based upon the value of the offset.

Figure 8A:
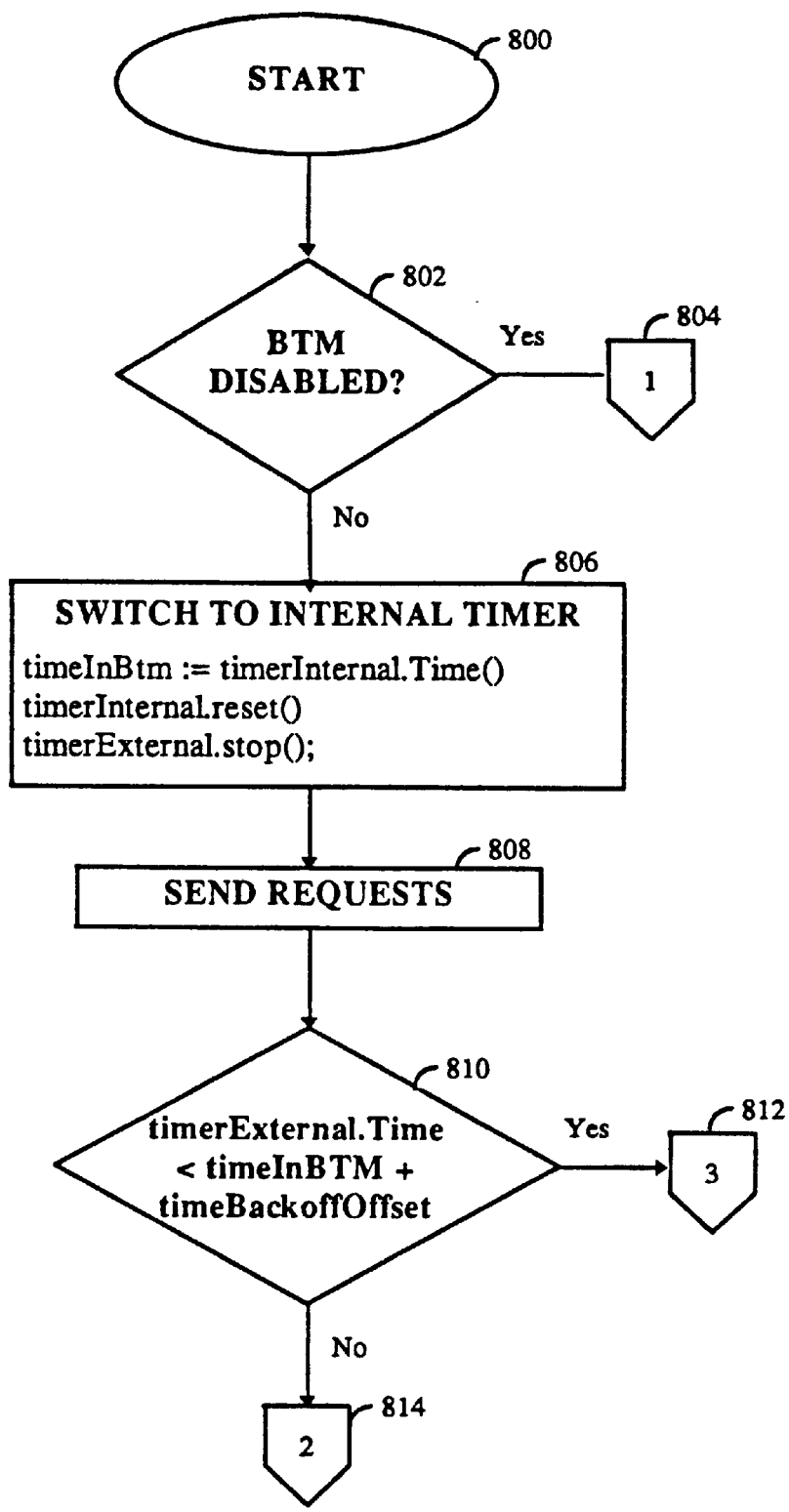
FIGS. 8a–8c show a flow diagram of the throttling of the processor from performing background transfers.

FIG. 8a shows a flow diagram of the throttling of the processor from performing background transfers. The flow diagram begins at a block 800 and continues at block 802, at which it is determined whether the BTM is disabled. If the BTM is disabled, for example, because the object manager 220 or the conference manager 230 has explicitly disabled background transfers, then the flow diagram proceeds at transfer block 804, which is continued in FIG. 8c.

However, if the BTM is not disabled at block 802, then operation continues at block 806, in which an internal timer is activated. The internal timer measures the amount of CPU-time spent executing within the BTM operation code (internal time). Additionally, in block 806, a timer which measures the amount of time outside of the BTM (external time) is disabled. In one embodiment, a variable timeInBTM is set to the amount of time spent within the BTM during the previous servicing window of the BTM. From block 806, operation continues at block 808 in which various requests are sent by the BTM. For example, the BTM sends messages to the other participants of the conference for retrieving data, sending data, and checking on status. The requests are normally batched together and sent as a group in order to reduce the amount of bus bandwidth associated with message passing.

From block 808, operation continues at block 810, at which the amount of time spent outside of the BTM is compared with the amount of time spent within the BTM (which was set in block 806) plus a backoff offset. If the time spent outside of the BTM is smaller than the time spent within the BTM plus the backoff offset, then the flow diagram continues at block 812, otherwise the flow diagram continues at block 814.

Figure 8B:
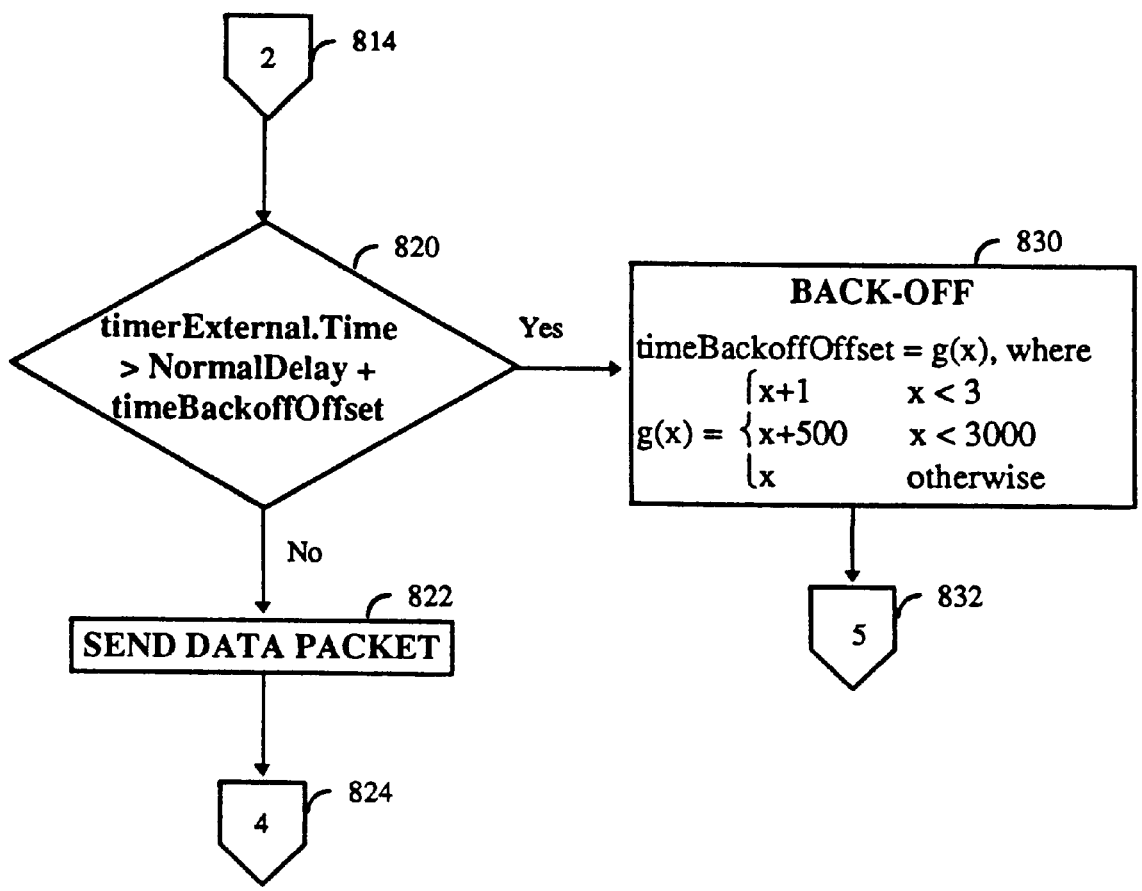

FIG. 8b is a continuation of FIG. 8a. The flow diagram continues from block 814 to block 820 in FIG. 8b, at which the amount of time spent outside of the BTM is compared against the value of a predetermined delay plus the backoff offset. In one embodiment, the predetermined delay is the normal delay between the grants of a servicing window by the operating system to the BTM. Although the normal delay varies depending upon the activity of the processor, an average value can be used as the predetermined delay. If the time spent outside the BTM is not larger than the predetermined delay plus the backoff offset, then operation continues at block 822, at which a data packet is transferred to one or more of the other participants. From block 822, operation continues at block 824, which is continued in FIG. 8c.

However, if at block 820, the time spent outside the BTM is larger than the predetermined delay plus the backoff offset, then operation continues at block 830, at which the backoff offset is adjusted. In one embodiment, the backoff offset is adjusted using a delayed stepping function with a clamped end. For example, in one embodiment, the function $g(x)$ is used, wherein $g(x) = x+1$, if $x \leq 3$
$x+500$, if $3 < x \leq 3000$
$x$, otherwise.

Thus, the "first three strikes" ($x \leq 3$) of the function $g(x)$ prevents throttling the backoff offset until it is certain that there is an on-going problem that the backoff offset is too low. The half second (500 millisecond) delay is arbitrary, but has been measured to be effective experimentally. The backoff offset is clamped at a 3 second delay, to prevent run-away throttling.

Figure 8C:
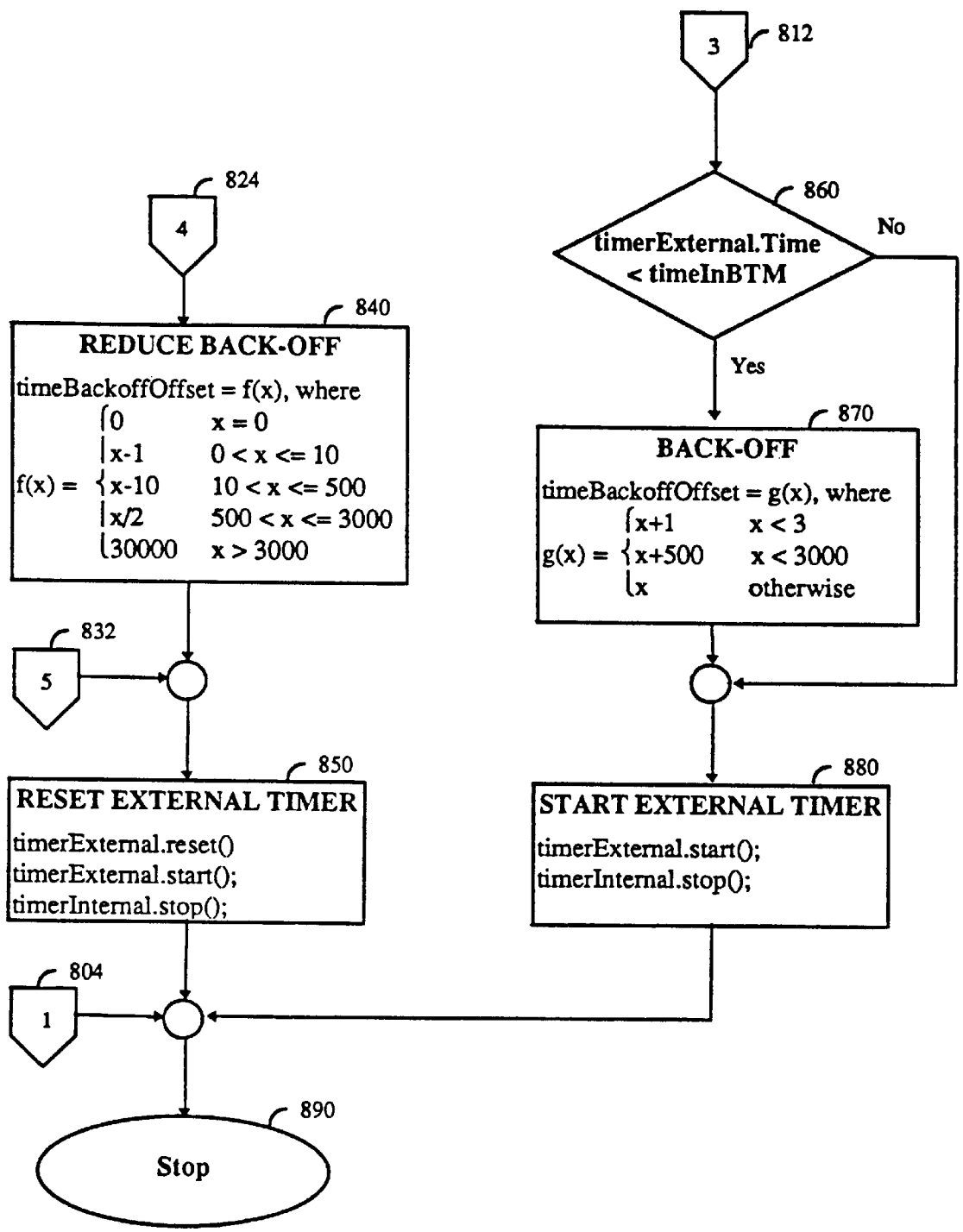

From step 830, operation continues at block 832, which is continued in FIG. 8c.

FIG. 8c is a continuation of FIGS. 8a and 8b. FIG. 8c includes continuations of block 804, 812, 824, and 832 which originate in either FIG. 8a or 8b. From block 824, the flow diagram continues at block 840, at which the backoff offset is reduced. In one embodiment, a function $f(x)$ is used wherein, if the backoff offset is defined as:

$f(x) = 0$, if $x = 0$ x−1, if 0<x≦10
x−10, if 10<x≦500
x/2, if 500<x≦3000
3000, if x>3000

From block 840 and block 832, the flow diagram continues at block 850, at which the external timer is reset. Additionally at block 850, the external timer is restarted, and the internal timer is stopped. Thus, any further comparisons against the time spent outside of the BTM use the new external timer values. The internal time is retained until it is saved into the variable timeInBTM (at block 806) during the next time that the flow diagram of FIGS. 8a–8c is invoked.

Returning to block 812 in FIG. 8c, the flow diagram proceeds at block 860, at which the external time is compared to the internal time. If the external time is less than the internal time, then operation continues at block 870, at which the backoff offset is adjusted. In one embodiment, the backoff offset is incremented in the same manner as it was adjusted in block 830, using a delayed step function which is clamped. From block 870, the flow diagram proceeds at block 880.

However, if from block 860, the external time is not less than the internal time, then operation continues at block 880. At block 880, the external timer is started and the internal timer is stopped. The internal time is retained until it is saved into the variable timeInBTM (at block 806) during the next time that the flow diagram of FIGS. 8a–8c is invoked.

From blocks 804, 850, and 880, the flow diagram terminates at the block 890.

The previous strategy, however, is insufficient for controlling processor domination arising from handling remotely-initiated messages. When Participant B requests data from Participant A, for example, the BTM builds a message at Participant B and sends it to Participant A. Participant A's BTM must respond to the message by providing the requested data and tracking the new request. Besides handling the request for providing data, the BTM also handles messages to stop sending data and messages to reprioritize transfers of data.

As an example, in the case of the BTM handling a request for data transfer, a problem arises when the local computer is much slower than the data provider. As data arrives, the BTM must save the data in the local copy of the BLOB, a comparatively time-consuming process. Note that this case is not covered by the flow diagram of FIGS. 8a, 8b, and 8c, since this case arises in response to a message delivery. However, because this computer is somewhat slow, and it receives data faster than it can process locally, the local BTM races to catch up. This results in CPU starvation for the application, and can potentially result in a fatal failure.

Common approaches for handling this problem include the use of acknowledgment messages and back-pressure. The former approach freezes transfers on the data-provider until all receivers have sent a reply indicating receipt of the last data packet. However, this approach lacks efficiency. First, the data provider loses CPU cycles waiting for a reply compared to the normal case, in which no transmission delay is required. Second, the network must carry a reply message needlessly. (An alternative is to reply to every Nth message, but the same problems exists, only slightly mitigated.)

The back-pressure approach, on the other hand, relies on the communication services of the multipoint link manager 240 to inform a message sender when a receiver has not handled the previous data packet. The communication services have a buffer where they temporarily store inbound messages; when the conference manager 230 is notified of a delivery, it asks for the message, removing it from the buffer. If the buffer is full, the communication services signal the sender's communications layer, which stops transmitting and marks the channel as "busy."

This mechanism is used in the conference manager 230. However, it has two significant limitations. First, the communication services themselves within the multipoint link manager 240 each handle messages differently, removing them from one buffer and adding them to another. As a result, the back-pressure is non-existent or too slow. Second, too many pending messages will clog memory on the receiver, just when the receiver needs more resources.

To resolve this, the BTM overloads the previously discussed throttling mechanism to support receiver delays. On receipt of a data packet, the participant will check the backoff offset for the participant receiving the data. If that value is above an active threshold (currently 500 ms), then the receiver is spending too much time in the BTM. A message is sent to the data provider, asking it to back-off as illustrated in FIG. 9.

Figure 9:
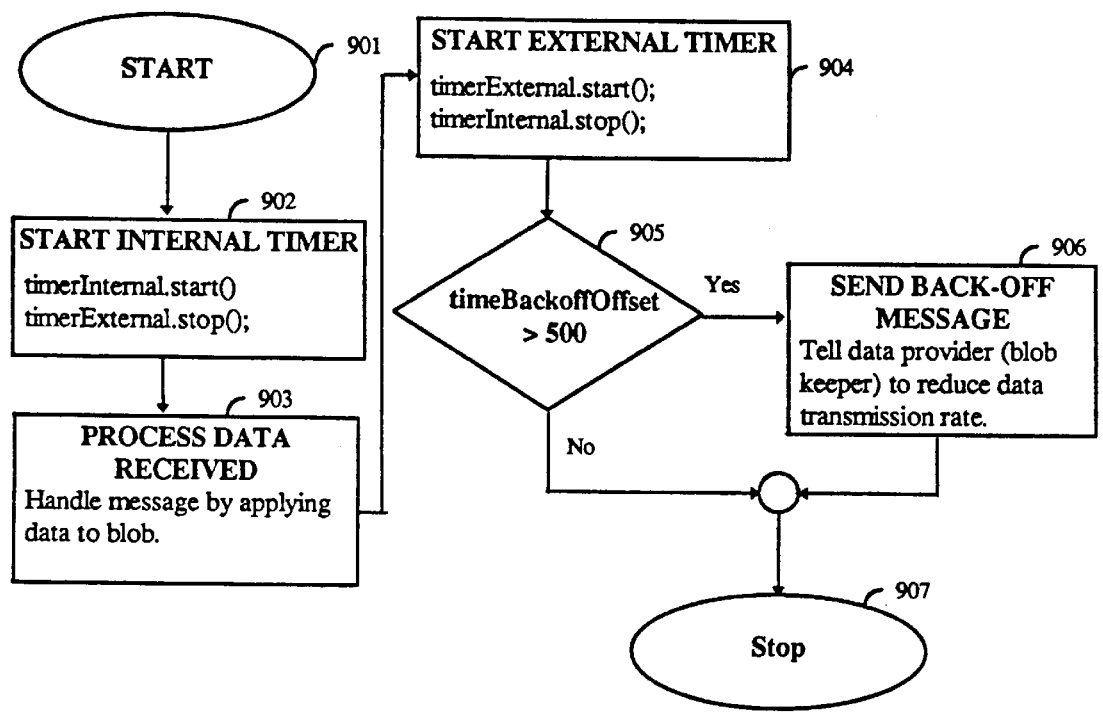
FIG. 9 shows a flow diagram showing the steps taken by the BTM when it receives a data packet.

FIG. 9 shows a flow diagram showing the steps taken by the BTM when it receives a data packet. The flow diagram begins at block 901 and continues at block 902, at which the internal timer is started. Also at block 902, the external timer is disabled. From the block 902, operation continues at block 903, at which the BTM handles the message that it received. This includes processing the data packet including BLOB information, which may also include copying the BLOB information into the BLOB structure. The flow diagram continues at block 904, at which the external timer is started and the internal timer is stopped.

From block 904, operation continues at block 905, at which the backoff offset is compared with a predetermined threshold value, for example, 500 milliseconds. If the backoff offset is larger than the predetermined threshold value, the operation continues at block 906, at which the BTM sends the participant providing it with data a message to reduce the data transmission rate. From the block 906, operation continues at block 907, at which the flow diagram terminates.

If at the block 905, the backoff offset is not larger than the predetermined threshold value, then operation also continues at block 907, at which the flow diagram terminates.

Note that it is important that the time that the BTM spends receiving messages is considered time within the BTM for the purposes of the internal and external timers. This allows the measurement to be accurate, indicating all of the time spent handling background transfers on a computer and throttling accordingly. When the keeper receives the backoff message, the keeper throttles back, just as if it had detected its own foreground application requiring more cycles, as shown in FIG. 10.

Figure 10:
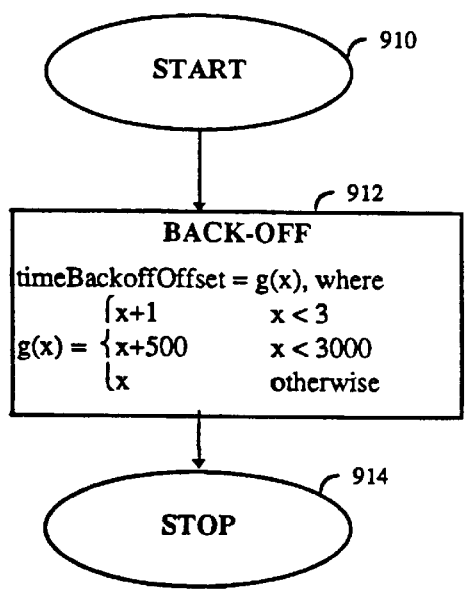
FIG. 10 shows the steps taken by a BTM providing data to another participant when it receives a back off message.

FIG. 10 shows the steps taken by a BTM providing data to another participant when it receives a back off message. The flow diagram begins at block 910 and continues at block 912, at which the backoff offset of the BTM is adjusted. In one embodiment, the BTM is adjusted by a function g(x), wherein g(x)=x+1, if x≦3
x+500, if 3<x≦3000
x, otherwise.

The flow diagram terminates at block 914. In one embodiment, the internal timer records the time spent within the BTM in adjusting the backoff offset. However, since the amount of time is minimal compared with the time to start and stop the internal and external timers, this step may be avoided.

Prioritizing Data Requests

In a multipoint conference, it is not uncommon for an application to have a priority for data delivery. For example, if a participant were expecting data for a bitmap of both pages 2 and 3, and the participant was looking at page 2 in the notebook, the participant would want to receive the data for the page he were viewing (from page 2) before the other data (from page 3).

This can be accomplished via a number of mechanisms. First, when data is first requested, the request can be inserted as the first of an outbound transfer list, implying that it will be sent before other requests. This is a LIFO approach, like a stack. Second, if the user were to change pages, the notebook would ask the object manager 220 to reprioritize the transfer, promoting the page that is currently visible.

In a multipoint conference, this becomes confused if participants are on different pages. Additionally, there are other complications with regard to more outbound transfers since unlocking BLOBs more quickly and reducing the total number of requests must be taken into consideration.

One traditional approach for this type of problem is to maintain a priority-ordered list for the BLOBs pending outbound transfer. The priority would be computed dynamically by a weighted function, something like $$P = \frac{\frac{(\text{Total \# Requesting})(\text{Time Since First Request})}{(\text{\# Participants Prioritizing} + 1)}}{(\text{Total \# Requesting} + 1)}$$

This priority scheme would favor sending data for the BLOB that has the most number of concurrent requests. It also allows the application to prioritize requests, where each participant has one vote for which blob should be sent first. Finally, the time the BLOB has been in the queue is put in the formulae to prevent starvation, that is, one BLOB never being sent due to continual re-prioritization for other data.

This approach has some disadvantages. First, the mechanism does not consider the effects of keeping BLOBs on the outbound transfer lists indefinitely. In one embodiment, BLOBs are "locked" whenever data is accessed for reading or writing. The process performing the access locks the BLOB into memory 104 and prevents the BLOB from being swapped to disk or to a secondary memory.

One mechanism for keeping track of whether a BLOB is locked is by using a counting semaphore. The counting semaphore starts in an initial unlocked state with a value zero. For each access to a BLOB, the counting semaphore is incremented by one. When the access is completed, then the counting semaphore is decremented by one. The BLOB is unlocked when the counting semaphore returns to the value zero. Thus, although BLOBs are swapped to disk when they aren't in use, this cannot be done while the BTM is actively sending data (accessing the BLOB). Therefore, partially transferred BLOBs take up memory resources. BLOBs are "unlocked" in order to promote another BLOB in front of it; however, this is expensive to do frequently. Thus, reducing the number of locked BLOBs is desirable.

Similar issues exist for the creating network channels to support transfers. In one embodiment, a channel is created to transfer data from one participant to another. Thus, maintaining partially transmitted BLOBs takes up network resources. A method of prioritizing, or re-prioritizing, transfers that favor completing those that have already started would be beneficial.

Figure 11:
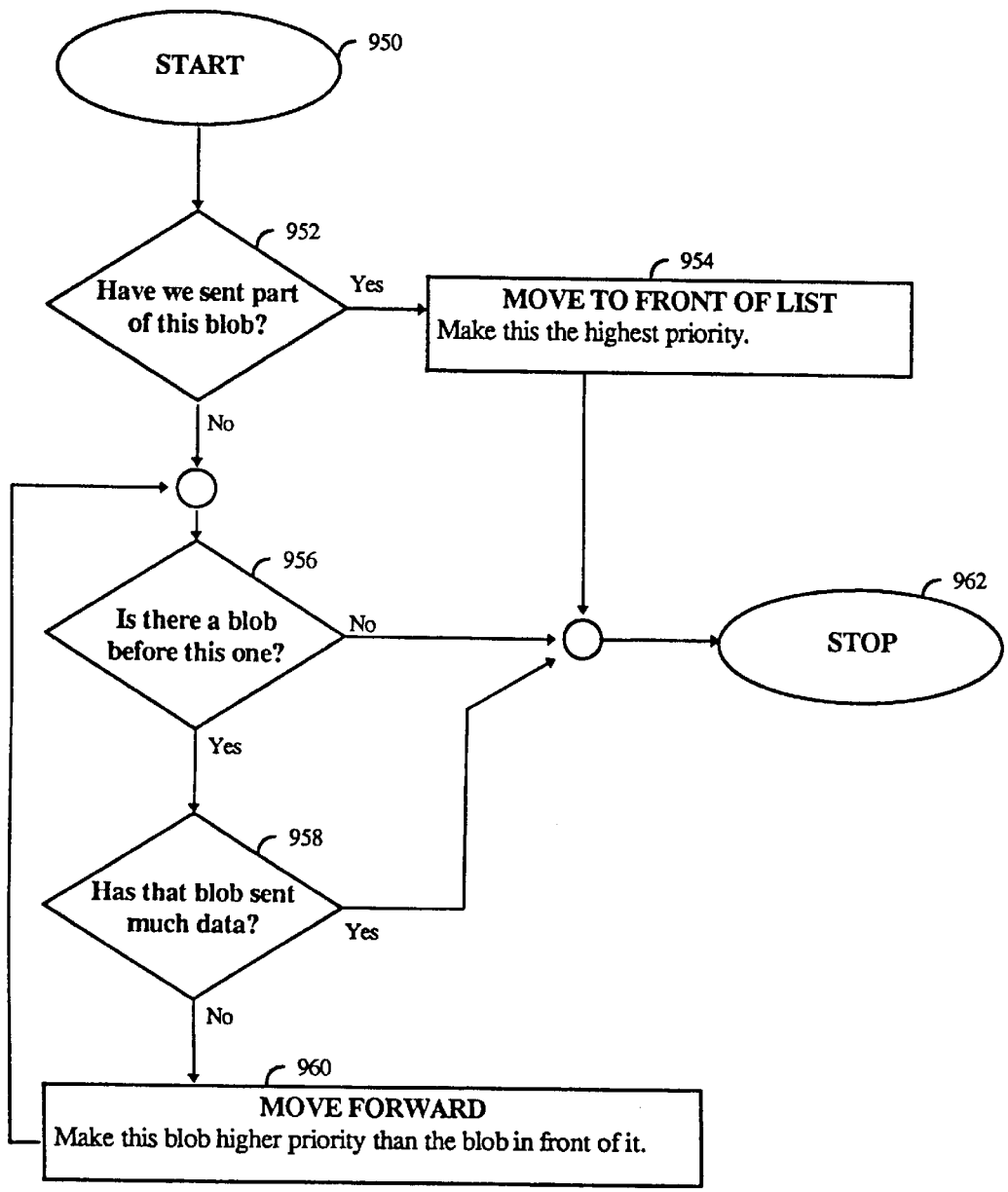
FIG. 11 shows a flow diagram of a simple approach for re-prioritizing transfers upon demand using an method that favors completing transfers that have already started.

FIG. 11 shows a flow diagram of a simple approach for re-prioritizing transfers upon demand using a method that favors completing transfers that have already started. The flow diagram of FIG. 11 begins at block 950 and continues at block 952, at which it is determined whether a part of the BLOB has been sent already. If a part of the BLOB has been sent, the operation moves to block 954, at which the new request is moved to the highest priority. From block 954, the flow diagram continues at block 962, at which the flow diagram terminates.

However, if at block 952, part of the BLOB has not been sent already, then the flow diagram proceeds at block 956, at which it is determined whether there is another BLOB in the queue before the current request. If there is no other BLOB in the queue before the current request, then the flow diagram proceeds at block 962, at which the flow diagram terminates.

If at block 956, there is another BLOB in the queue before the current request, then the flow diagram continues at block 958, at which it is determined whether the BLOB has already sent over a certain amount of data. The amount of data can be represented in a variety of different ways. For example, it can be represented as a percentage of the total amount to be transferred or by measuring the time required to send the rest of the data using the data rate in the measurement. If the previous BLOB has sent over a certain amount of data already, then operation continues at block 962, at which the flow diagram terminates. Thus, the previous BLOB is allowed to maintain its priority.

However, if at the block 958, the previous BLOB has not sent over a certain amount of data already, then operation moves to block 960, at which the current request is moved in front of the previous BLOB in the queue. From block 960, the flow diagram loops back to block 956.

Thus, a method and apparatus for the transfer of data in an electronic conferencing system is disclosed. The different aspects of recovering lost data, preventing processor domination, and prioritizing data requests can be used simultaneously to more efficiently transfer data. The specific arrangements and methods described herein are merely illustrative of the principles of this invention. Numerous modifications in form and detail may be made without departing from the scope of the described invention. Although this invention has been shown in relation to a particular embodiment, it should not be considered so limited. Rather, the described invention is limited only by the scope of the appended claims.

What is claimed is:

1. In an electronic conferencing system wherein data is shared between a plurality of participants during an electronic conference, a method of preventing domination of a CPU by background transfers of teleconference object data among the plurality of participants, the method comprising the steps of:

a) monitoring an external time spent by the CPU executing outside a background transfer manager; and b) transfering a data packet of teleconference object data to one or more of the plurality of participants of the electronic conference if the external time is larger than a minimum threshold and smaller than a maximum threshold.

2. The method of claim 1 wherein the teleconference object data is a binary large object (BLOB).

3. The method of claim 1 further comprising the step of c) monitoring an internal time spent by the CPU executing inside the background transfer manager;

and wherein the minimum threshold is the internal time plus a variable offset.

4. The method of claim 3 further comprising the step of:

d) increasing the variable offset if the external time is less than the internal time.

5. The method of claim 4 wherein the maximum threshold is a predetermined delay plus the variable offset.

6. The method of claim 5 wherein the predetermined delay is related to an average frequency of servicing of the background transfer manager.

7. The method of claim 6 further comprising the step of:

e) increasing the variable offset if the external time is greater than the predetermined delay plus the variable offset.

8. The method of claim 7 wherein increasing the variable offset in the steps d) and e) is performed by raising the offset by a first amount for a first number of times that the variable offset is raised and raising the variable offset by a second amount for a second number of times that the variable offset is raised, wherein the first amount is different from the second amount.

9. The method of claim 8 wherein increasing the variable offset in the steps d) and e) is performed by clamping the variable offset at a predetermined maximum.

10. The method of claim 7 further comprising the step of:

f) reducing the variable offset after each step of transferring the data packet of the teleconference object data to the one or more of the plurality of participants.

11. In an electronic conferencing system wherein data is shared between a plurality of participants during an electronic conference, an apparatus for preventing domination of a CPU by background transfers of teleconference object data among the plurality of participants, the apparatus comprising:

a) means for monitoring an external time spent by the CPU executing outside a background transfer manager; and b) means for transfering a data packet of teleconference object data to one or more of the plurality of participants of the electronic conference if the external time is larger than a minimum threshold and smaller than a maximum threshold.

12. The apparatus of claim 11 further comprising:

c) means for monitoring an internal time spent by the CPU executing inside the background transfer manager;

and wherein the minimum threshold is the internal time plus a variable offset.

13. The apparatus of claim 12 wherein the maximum threshold is a predetermined delay plus the variable offset.

14. The apparatus of claim 13 wherein the predetermined delay is related to an average frequency of servicing of the background transfer manager.

15. The apparatus of claim 14 further comprising:

e) means for increasing the variable offset if the external time is greater than the predetermined delay plus the variable offset.

16. The apparatus of claim 15 further comprising:

f) means for reducing the variable offset after each step of transferring the data packet of the teleconference object data to the one or more of the plurality of participants.

17. The apparatus of claim 11 wherein the teleconference object data is a binary large object (BLOB).

18. In an electronic conferencing system wherein data is shared between a plurality of participants during an electronic conference, an apparatus for preventing domination of a CPU by background transfers of teleconference object data among the plurality of participants, the apparatus comprising:

a) a first timer for monitoring an external time spent by the CPU executing outside a background transfer manager; and b) a transmission circuit for transfering a data packet of teleconference object data to one or more of the plurality of participants of the electronic conference if the external time is larger than a minimum threshold and smaller than a maximum threshold.

19. The apparatus of claim 18 further comprising:

c) a second timer for monitoring an internal time spent by the CPU executing inside the background transfer manager;

and wherein the minimum threshold is the internal time plus a variable offset.

20. The apparatus of claim 19 wherein the maximum threshold is a predetermined delay plus the variable offset.

21. The apparatus of claim 20 wherein the predetermined delay is related to an average frequency of servicing of the background transfer manager.

22. The apparatus of claim 21 further comprising:

e) a delay circuit for increasing the variable offset if the external time is greater than the predetermined delay plus the variable offset.

23. The apparatus of claim 18 wherein the teleconference object data is a binary large object (BLOB).

24. An electronic conferencing system comprising:

two or more computer systems networked together via a communication medium, each of the computer systems including a communications manager for communicating via the communication medium, each of the computer systems running an application which shares object data among the two or more computer systems, each of the applications having a background transfer manager which prevents domination by background activities of a CPU of each of the computer systems.

25. A system comprising:

a processor capable of running foreground activities and background activities;

a communications manager for communicating to one or more other systems via a communication medium; and a background transfer manager for transferring as one of the background activities data to the one or more other systems via the communications manager, the background transfer manager preventing domination of the processor by the background activities.

* * * * *

UNITED STATES PATENT AND TRADEMARK OFFICE
CERTIFICATE OF CORRECTION

PATENT NO. : 5,925,105
DATED : July 20, 1999
INVENTOR(S) : Hales, II et al.

Page 1 of 1

It is certified that error appears in the above-identified patent and that said Letters Patent is hereby corrected as shown below:

<u>Column 1,</u>
Line 21, delete "modem" and insert -- modern --.

Signed and Sealed this

Twenty-fifth Day of May, 2004

JON W. DUDAS
*Acting Director of the United States Patent and Trademark Office*